US008984448B2

(12) United States Patent
Lewin et al.

(10) Patent No.: US 8,984,448 B2
(45) Date of Patent: *Mar. 17, 2015

(54) METHOD OF RENDERING A USER INTERFACE

(71) Applicant: Research in Motion Limited, Waterloo (CA)

(72) Inventors: Mathias Lewin, Malmö (SE); Jens Ola Andersson, Malmö (SE); Peter Ljungkrantz, Malmö (SE); Christoffer Gurell, Malmö (SE); Johan Mowitz, Malmö (SE)

(73) Assignee: BlackBerry Limited, Waterloo, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/654,930

(22) Filed: Oct. 18, 2012

(65) Prior Publication Data

US 2013/0097521 A1 Apr. 18, 2013

Related U.S. Application Data

(60) Provisional application No. 61/548,664, filed on Oct. 18, 2011.

(51) Int. Cl.
*G06F 3/048* (2013.01)
*G06F 9/44* (2006.01)
*G06T 15/00* (2011.01)

(52) U.S. Cl.
CPC ............ *G06F 9/4443* (2013.01); *G06T 15/005* (2013.01); *G06T 2200/24* (2013.01); *G06T 2200/16* (2013.01); *G06T 2210/61* (2013.01)

USPC .......................................... 715/853; 715/788

(58) Field of Classification Search
USPC ......................................................... 715/744
See application file for complete search history.

(56) References Cited

U.S. PATENT DOCUMENTS

| 5,559,301 | A | 9/1996 | Bryan, Jr. et al. |
| 5,880,729 | A | 3/1999 | Johnston, Jr. et al. |
| 6,791,587 | B1 * | 9/2004 | Bamford et al. ............... 715/854 |
| 6,885,374 | B2 * | 4/2005 | Doyle et al. .................. 345/505 |

(Continued)

FOREIGN PATENT DOCUMENTS

| EP | 1566745 | | 8/2005 |
| EP | 1566754 | A2 | 8/2005 |

OTHER PUBLICATIONS

Extended European Search Report mailed Feb. 5, 2013, in European patent application No. 12189044.6.

(Continued)

*Primary Examiner* — Ryan Pitaro
*Assistant Examiner* — Daniel Samwel
(74) *Attorney, Agent, or Firm* — Fish & Richardson P.C.

(57) ABSTRACT

A user interface (UI) is presented in which a UI client engine is associated with an application, and a UI rendering engine is associated with the client engine. The UI client engine processes a client thread to manage a scene graph. The UI rendering engine receives the scene graph and data items associated with elements of the scene graph, and processes a rendering thread to render a UI in accordance with the scene graph and the data items, independently of further input from the client UI engine.

30 Claims, 18 Drawing Sheets

(56) References Cited

U.S. PATENT DOCUMENTS

| | | | |
|---|---|---|---|
| 6,919,891 B2* | 7/2005 | Schneider et al. | 345/440 |
| 7,012,606 B2* | 3/2006 | Swedberg et al. | 345/473 |
| 7,275,221 B2 | 9/2007 | McKeon | |
| 7,290,208 B2* | 10/2007 | Saborowski et al. | 715/234 |
| 7,290,216 B1 | 10/2007 | Kawahara et al. | |
| 7,436,406 B2* | 10/2008 | Dautelle | 345/441 |
| 7,479,949 B2* | 1/2009 | Jobs et al. | 345/173 |
| 7,703,045 B1* | 4/2010 | Kawahara et al. | 715/853 |
| 8,365,144 B1* | 1/2013 | Webb | 717/109 |
| 2004/0189669 A1 | 9/2004 | David et al. | |
| 2005/0108735 A1 | 5/2005 | Need et al. | |
| 2005/0182844 A1 | 8/2005 | Johnson et al. | |
| 2006/0244754 A1 | 11/2006 | Beda et al. | |
| 2007/0211022 A1 | 9/2007 | Boillot | |
| 2008/0005703 A1 | 1/2008 | Radivojevic et al. | |
| 2008/0155478 A1* | 6/2008 | Stross | 715/849 |
| 2009/0139778 A1 | 6/2009 | Butler et al. | |
| 2010/0289804 A1* | 11/2010 | Jackman et al. | 345/520 |
| 2010/0325565 A1 | 12/2010 | Skinner | |
| 2011/0119615 A1 | 5/2011 | Cisler et al. | |
| 2012/0044251 A1* | 2/2012 | Mark et al. | 345/474 |
| 2012/0144333 A1* | 6/2012 | Shatalin et al. | 715/771 |
| 2013/0055072 A1 | 2/2013 | Arnold et al. | |

OTHER PUBLICATIONS

Office Action mailed Aug. 30, 2013, in U.S. Appl. No. 13/654,914.
Extended European Search report mailed Oct. 22, 2013, in European patent application No. 12189052.9.
Non-Final Office Action mailed Jul. 11, 2014; in U.S. Appl. No. 13/654,914.
Office Action mailed Apr. 22, 2014; in Canadian patent application No. 2,792,895.
Extended European Search Report mailed Sep. 24, 2014; in corresponding European patent application No. 12189085.9.
Response to Examiner's Requisition filed Oct. 21, 2014; in corresponding Canadian patent application No. 2,792,895.
Response to Examiner's Requisition filed Oct. 21, 2014; in corresponding Canadian patent application No. 2,792,662.
Non-Final office Action mailed Oct. 6, 2014; in U.S. Appl. No. 13/654,947.

* cited by examiner

METHOD OF RENDERING A USER INTERFACE

CROSS-REFERENCE TO RELATED APPLICATION

This application claims priority to U.S. Provisional Application No. 61/548,664 filed Oct. 18, 2011, which is fully incorporated by reference herein.

FIELD OF TECHNOLOGY

The present disclosure relates to electronic devices including, but not limited to, portable electronic devices.

BACKGROUND

Electronic devices, including portable electronic devices, have gained widespread use and may provide a variety of functions including, for example, telephonic, electronic messaging and other personal information manager (PIM) application functions. Portable electronic devices comprise several types of devices including mobile stations such as simple cellular telephones, smart telephones, Personal Digital Assistants (PDAs), tablet computers, and laptop computers, that may have wireless network communications or near-field communications connectivity such as Bluetooth® capabilities. In addition, electronic devices are also widely used in personal entertainment and infotainment systems, for example, portable media players and automobile infotainment systems.

The popularity of electronic devices is driven by user experiences and the interaction between people and the devices via user interfaces. User Interfaces (UIs) that are user friendly and intuitive, functional and stylish, vivid and life-like drive the attractiveness of the device to a consumer.

Improvements in the method of generating and presenting user interfaces are desirable.

BRIEF DESCRIPTION OF THE DRAWINGS

Embodiments of the present disclosure will now be described, by way of example only, with reference to the attached Figures, wherein:

FIG. 11 is an illustration of a runtime behavior of the UI driven UI architecture using a Contacts List application;

DETAILED DESCRIPTION

Figure 1:
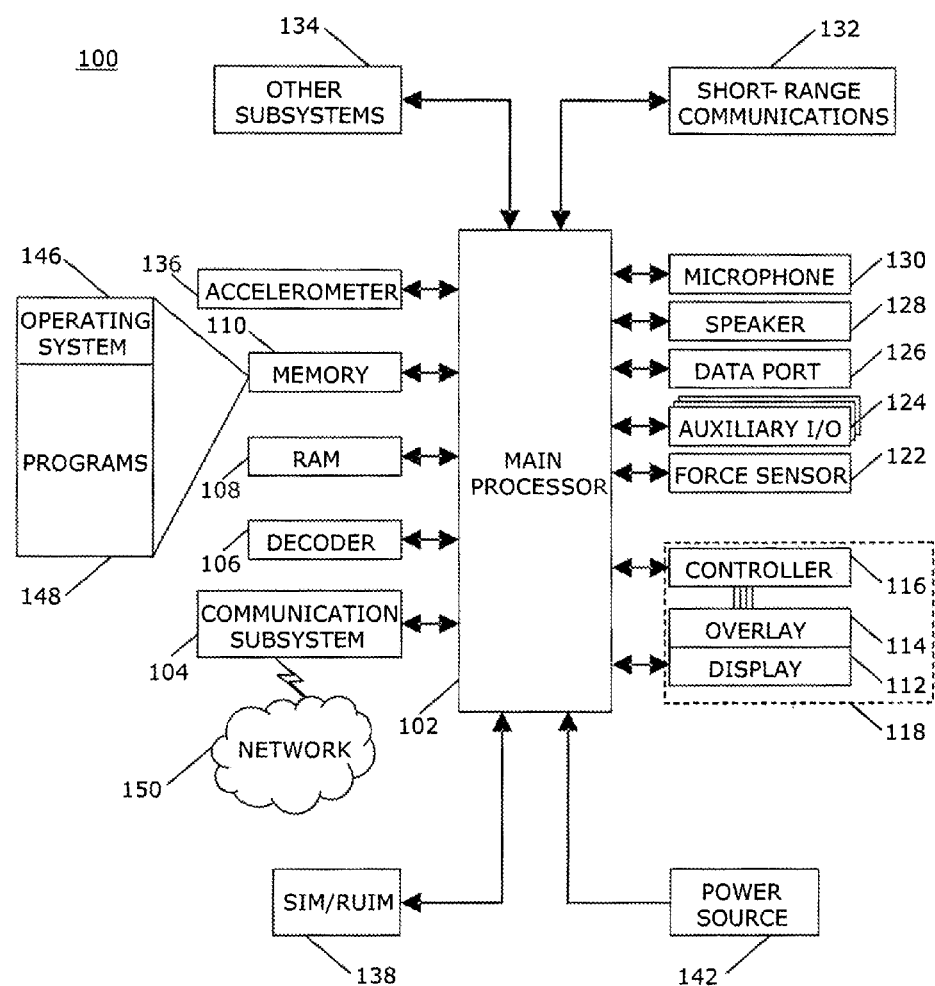
FIG. 1 is a block diagram of a portable electronic device in accordance with an example embodiment.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device. Examples of portable electronic devices include wireless communication devices such as pagers, mobile or cellular phones, smartphones, wireless organizers, PDAs, notebook computers, netbook computers, tablet computers, and so forth. The portable electronic device may also be a portable electronic device without wireless communication capabilities. Examples include handheld electronic game device, digital photograph album, digital camera, notebook computers, netbook computers, tablet computers, or other device. The electronic devices may also be a device used in personal entertainment and infotainment systems, for example, portable media players and automobile infotainment systems.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communication subsystem 104 and a short-range communications 132 module to perform various communication functions, including data and voice communications. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 to detect direction of gravitational forces or gravity-induced reaction forces so as to determine, for example, the orientation or movement of the portable electronic device 100.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104, for example.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example embodiment, the touch-sensitive display 118 is a capacitive touch-sensitive display which includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 112 of the touch-sensitive display 118 includes a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact, known as the centroid. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The location of the touch moves as the detected object moves during a touch. The controller 116 and/or the processor 102 may detect a touch by any suitable contact member on the touch-sensitive display 118. Similarly, multiple simultaneous touches are detected.

One or more gestures are also detected by the touch-sensitive display 118. A gesture is a particular type of touch on a touch-sensitive display 118 that begins at an origin point and continues to an end point. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture.

An example of a gesture is a swipe (also known as a flick). A swipe has a single direction. The touch-sensitive overlay 114 may evaluate swipes with respect to the origin point at which contact is initially made with the touch-sensitive overlay 114 and the end point at which contact with the touch-sensitive overlay 114 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 114 to initialize the gesture, a horizontal movement of the detected object from the origin point to an end point towards the right or left side of the touch-sensitive overlay 114 while maintaining continuous contact with the touch-sensitive overlay 114, and a breaking of contact with the touch-sensitive overlay 114. Similarly, a vertical swipe typically comprises an origin point towards the top or bottom of the touch-sensitive overlay 114 to initialize the gesture, a horizontal movement of the detected object from the origin point to an end point towards the bottom or top of the touch-sensitive overlay 114 while maintaining continuous contact with the touch-sensitive overlay 114, and a breaking of contact with the touch-sensitive overlay 114.

Swipes can be of various lengths, can be initiated in various places on the touch-sensitive overlay 114, and need not span the full dimension of the touch-sensitive overlay 114. In addition, breaking contact of a swipe can be gradual in that contact with the touch-sensitive overlay 114 is gradually reduced while the swipe is still underway.

Meta-navigation gestures may also be detected by the touch-sensitive overlay 114. A meta-navigation gesture is a gesture that has an origin point that is outside the display area of the touch-sensitive overlay 114 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 114. Thus, two fingers may be utilized for meta-navigation gestures. Further, multi-touch meta-navigation gestures may be distinguished from single touch meta-navigation gestures and may provide additional or further functionality.

In some example embodiments, an optional force sensor 122 or force sensors is disposed in any suitable location, for example, between the touch-sensitive display 118 and a back of the portable electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
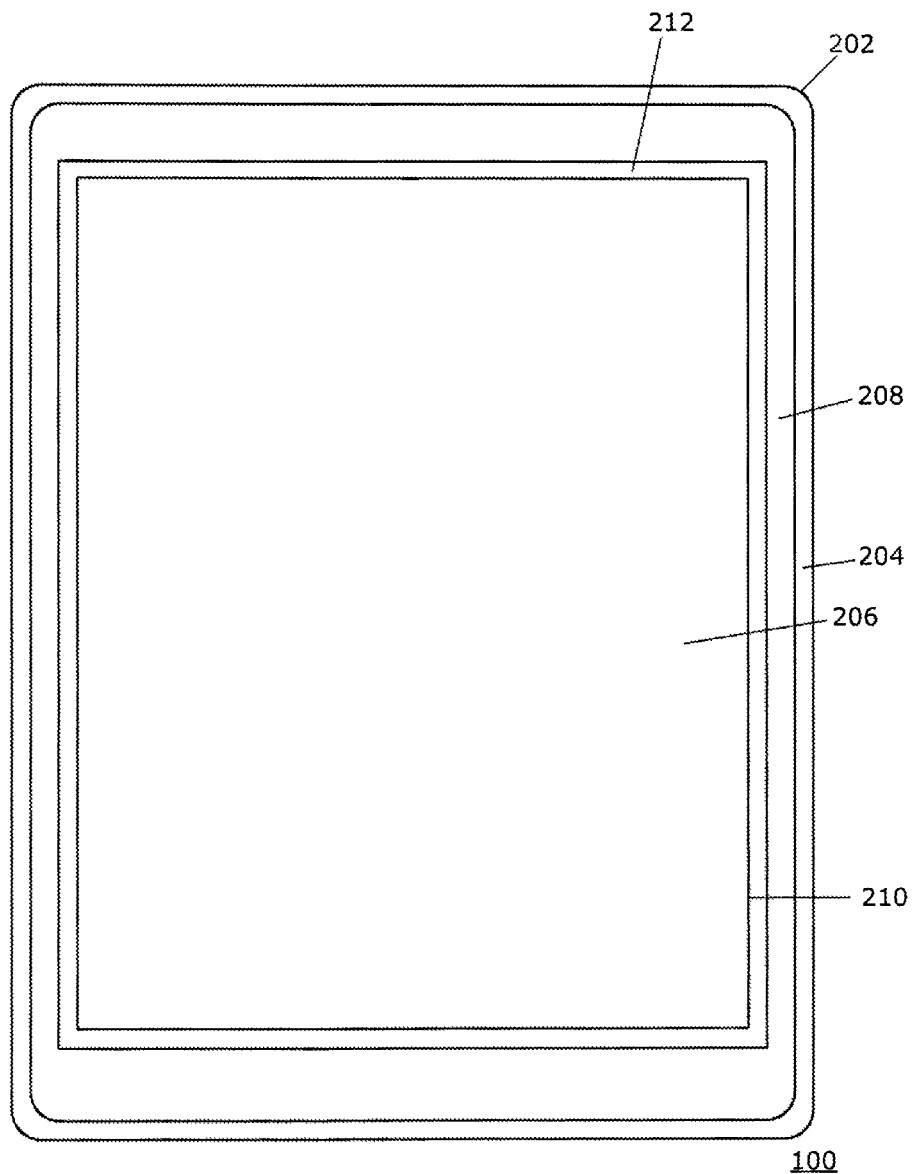
FIG. 2 is a front view of an example of a portable electronic device.

A front view of an example of the portable electronic device 100 is shown in FIG. 2. The portable electronic device 100 includes a housing 202 that encloses components such as shown in FIG. 1. The housing 202 may include a back, sidewalls, and a front 204 that frames the touch-sensitive display 118.

In the shown example of FIG. 2, the touch-sensitive display 118 is generally centered in the housing 202 such that a display area 206 of the touch-sensitive overlay 114 is generally centered with respect to the front 204 of the housing 202. The non-display area 208 of the touch-sensitive overlay 114 extends around the display area 206. A boundary 210 between the display area 206 and the non-display area 208 may be used to distinguish between different types of touch inputs, such as touches, gestures, and meta-navigation gestures. A buffer region 212 or band that extends around the boundary 210 between the display area 206 and the non-display area 208 may be utilized such that a meta-navigation gesture is identified when a touch has an origin point outside the boundary 210 and the buffer region 212 and crosses through the buffer region 212 and over the boundary 210 to a point inside the boundary 210. Although illustrated in FIG. 2, the buffer region 212 may not be visible. Instead, the buffer region 212 may be a region around the boundary 210 that extends a width that is equivalent to a predetermined number of pixels, for example. Alternatively, the boundary 210 may extend a predetermined number of touch sensors or may extend a predetermined distance from the display area 206. The boundary 210 may be a touch-sensitive region or may be a region in which touches are not detected.

The electronic device 100 may also include an object sensor and a motion sensor (both not shown) in communication with the processor 102. The object sensor detects movement of an object relative to the electronic device during a period of contactless object movement. The motion sensor detects motion of the device during the period of contactless object movement. The processor, which may be configured as a gesture determinator, is configured to determine a gesture that corresponds to the movement of the object and to the movement of the device during the period of contactless object movement. In an example embodiment, the processor may be configured to compensate for the device movement when determining the gesture, such as by subtracting the device movement from the object movement. Thus, a more accurate determination of an intended gesture, such as a three-dimensional gesture can be made.

Detection of gestures relative to the device, such as above the display 112, allows for enhanced user interface (UI) functionality. However, if the device 100 is held in one hand of a user and the gesture is made or caused by the user's other hand, movement of the device may be mistakenly processed and determined to be movement associated with the gesture being made above the device, resulting in an erroneous determination of the gesture. In the present disclosure, the terms "motion" and "movement" are used interchangeably.

A contactless position, or contactless object position, is an object position at which the object is free of contact with the portable electronic device 100. For example, an object is in a contactless object position when the object is free of contact with the display 112. Contactless object movement is an object movement during which the object is free of contact with the device 100. A contactless gesture is based on contactless object movement. For example, a contactless gesture can include a contactless object movement above the display 112 of the device 100, without making contact with the display 112. Contactless object position and movement is in contrast to a gesture made on the display 112, such as the type of gesture typically associated with a device having a touch-sensitive display.

A three-dimensional gesture includes a gesture associated with movement that has at least one component in an axis or plane additional to the plane of the display 112 of the device 100. A standard gesture on a touch-sensitive display can include movement in the x and y axes and can also include contributions based on time delay, force intensity, and other factors. A three-dimensional gesture is a gesture performed relative to the device 100, such as above the display 112 in the z axis. Adding a further z axis component to a gesture can expand the number, type and variation of gestures that can be used to control the device 100. In example embodiments described herein, a contactless three-dimensional gesture is performed relative to the device 100 without making contact with the display 112.

In some example embodiments, the three-dimensional gesture is performed relative to the device 100 without making contact with the display 112. In other example embodiments, the three-dimensional gesture includes some contact with the display 112.

Examples of three-dimensional gestures and their determination are discussed in United States Patent Application Publication No. 2008/005703A1 entitled "Apparatus, methods and computer program products providing finger-based and hand-based gesture commands for portable electronic device applications". Other discussions of examples of three-dimensional gestures and their determination are found in the following: United States Patent Application Publication No. 2009/0139778A1 entitled "User Input Using Proximity Sensing"; United States Patent Application Publication No. 2007/02211022A1 entitled "Method and Device for Three-Dimensional Sensing". Each of these documents is incorporated herein by reference.

Typically, users interact with electronic devices with touch-sensitive displays via user interfaces (UIs), e.g. graphical user interfaces (GUIs). UIs may be rendered on the display prior to or after the detection of touch events by the touch-sensitive display 118. For example, when running a web browser application on the electronic device 100, the contents of a web page may be displayed on the display 112. Once the contents of the webpage have been rendered (or loaded) on the display 112, the UIs may not be displayed until the touch-sensitive display 118 detects a touch event, e.g., a user wanting to scroll down the contents (a scroll bar UI may then be rendered on the display), move away from the web page (the URL input area may be rendered on the display), or close the web browser application (a UI to close, minimize, adjust the size of the browser may be rendered on the display). In some instances, actions may be taken by the processor 102 without the rendering of UIs, e.g., a pinch gesture for zooming out, a flick gesture for turning a page on a reader application, etc.

UIs may be generally visualized as a graphical scene comprising elements or objects (also referred to as entities). Data structures known as scene graphs may be used to define the logical and/or spatial representation of a graphical scene. A scene graph is a collection of nodes in a graph or tree structure. The elements or objects of a UI may be represented as nodes in the scene graph. A node in a scene graph may have many children. The parent node of a scene graph that does not itself have a parent node corresponds to the overall UI.

Consequently, an effect applied to a parent is applied to all its child nodes, i.e., an operation performed on the parent of a group (related by a common parent) automatically propagates to all of its child nodes. For example, related objects/entities may be grouped into a compound object (also known as a layout), which may by moved, transformed, selected, etc., as a single group. In general, a layout can be any grouping of UI elements or objects. The term "container" as used herein refers to layouts that group UI elements in a particular ordered manner. A parent node can have one or more child nodes that can be, for example, any type of layout including a container.

Each container can in turn have its own child nodes, which may be, for example, other container nodes, basic UI elements or special effect nodes. The basic UI elements correspond to discrete components of the UI such as, for example, a button or a slider. A leaf node in a scene graph corresponds to a basic UI element. A leaf node does not have any child nodes.

As mentioned above, containers are layouts that group interface elements in a particular ordered manner. Containers can be of various types, including but not limited to, docking containers, stacking containers, grid-based containers, and scrolling containers.

A docking container refers to a layout that permits its children to dock to the edges of other items in the layout.

A stacking container refers to a layout that stacks its child components. The child components can be stacked, for example, vertically or horizontally. A stacking container dynamically recalculates the layout as changes occur to its children. For example, if the size of or number of its children changes then the layout is recalculated. This can occur in, for example, dynamically sized lists.

A grid container refers to a layout that orders its children in a grid structure.

A scrolling container refers to a layout that is used to scroll its contents if the number of items in the layout is too great to fit inside the layout.

Figure 3:
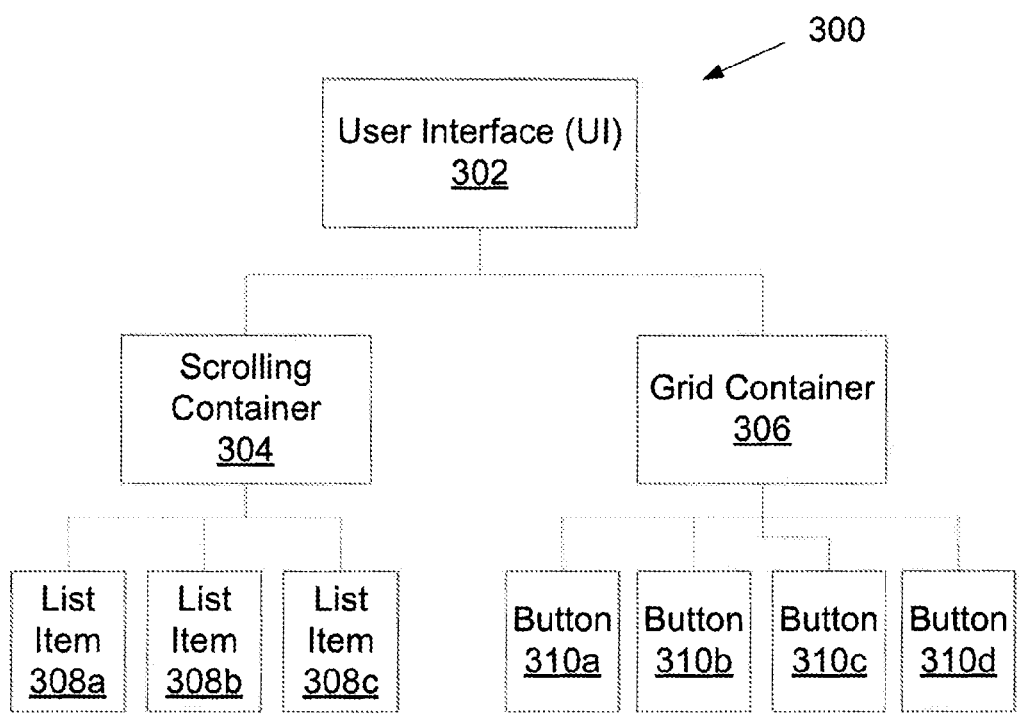
FIG. 3 is an illustration of a schematic diagram of a scene graph associated with an UI.

FIG. 3 illustrates a schematic diagram of a scene graph 300. Scene graph 300 comprises a parent node 302, which has two child nodes 304 and 306. Child node 304 has three child nodes 308a to 308c, each of which is a leaf node. Child node 306 has four child nodes 310a to 310d, each of which is a leaf node.

Child node 304 is a scrolling container and is used to represent a list. Each item in the list is represented by one of nodes 308a to 308c. Child node 306 is a grid container and is used to represent a number of buttons ordered in a grid configuration. Accordingly, each of nodes 310a to 310d represent buttons. Accordingly, the overall user interface represented by parent node 302 has a list, which is represented by child node 304, and a set of buttons arranged in a grid pattern, which is represented by child node 306.

In addition, animation nodes are nodes that are used to create animation in a UI. Animation nodes are of various types, including but not limited to, special effects nodes and particle system effects.

Examples of special effect nodes include, but are not limited to, kernel effects, pixel effects, water effects, blob effects and image fade effects.

Kernel effects are based on more than one pixel. Examples include blur and sharpen effects. Pixel effects are performed on all pixels in an area. Examples include colorizing a set of pixels and the saturating a set of pixels. Water effects include distortion effects that resemble water such as, for example, a rippled surface. Blob effects include various types of displacement effects that resemble liquid behavior. Image fade effects are used to perform transition effects.

Particle system effects are used to create a wide range of organic user interface effects such as sparkles, smoke, fire, star fields, and lava. The behavior and properties of the particles such as, direction, lifetime, number, velocity, randomness can be selected and controlled. All elements in the UI may be treated as particles. In addition, the particles can have a z-value (in addition to x- and y-values) that can be used with perspective computations to provide a three-dimensional look to the UI.

Figure 4:
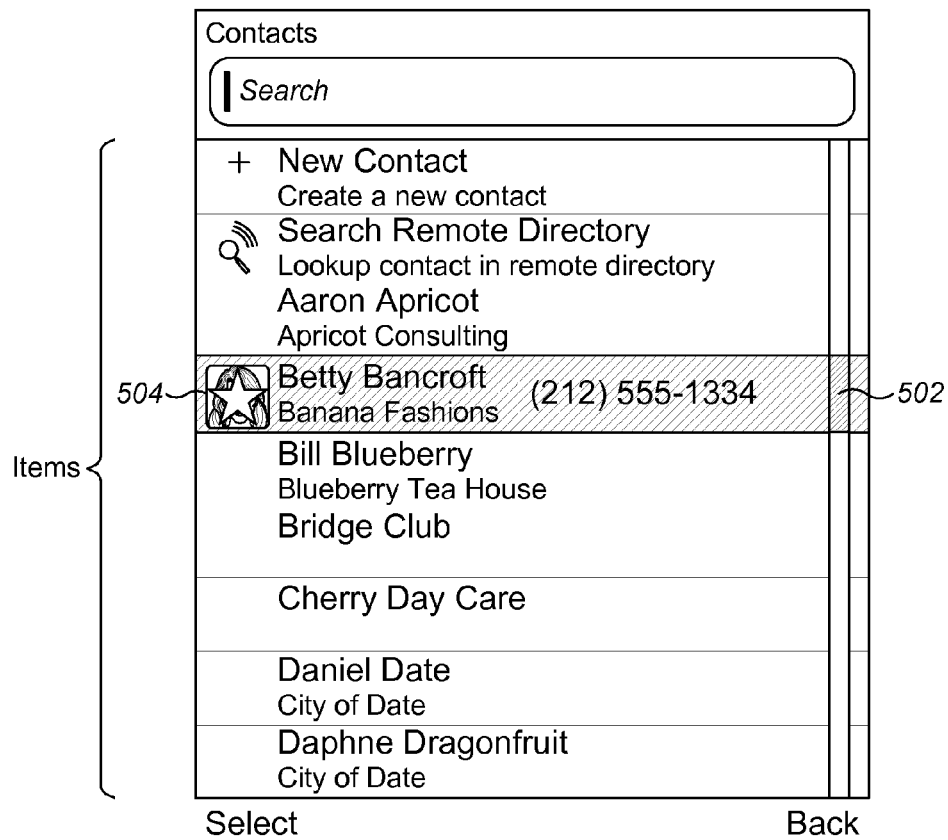
FIG. 4 is a graphical user interface (GUI) displayed on the display of the portable electronic device.

FIG. 4 shows a graphical user interface (GUI) displayed on the display 112 of the electronic device 100. The GUI indicates that a Contacts List application is running on the electronic device. The GUI is a listing (a partial listing) of entries in the contacts list; these entries constitute data items that are (can be) displayed. At the right of the GUI is a cursor 502 that can be moved vertically to scroll through the listing of entries. At the bottom of the GUI are a select button and a back button to respectively select an highlighted item 504 and navigate to a previous GUI. In this example, which uses the tree structure of FIG. 4, the Contacts List application is programmed to change the GUI in order to show a picture and the phone number of the highlighted contact 504.

Figure 5:
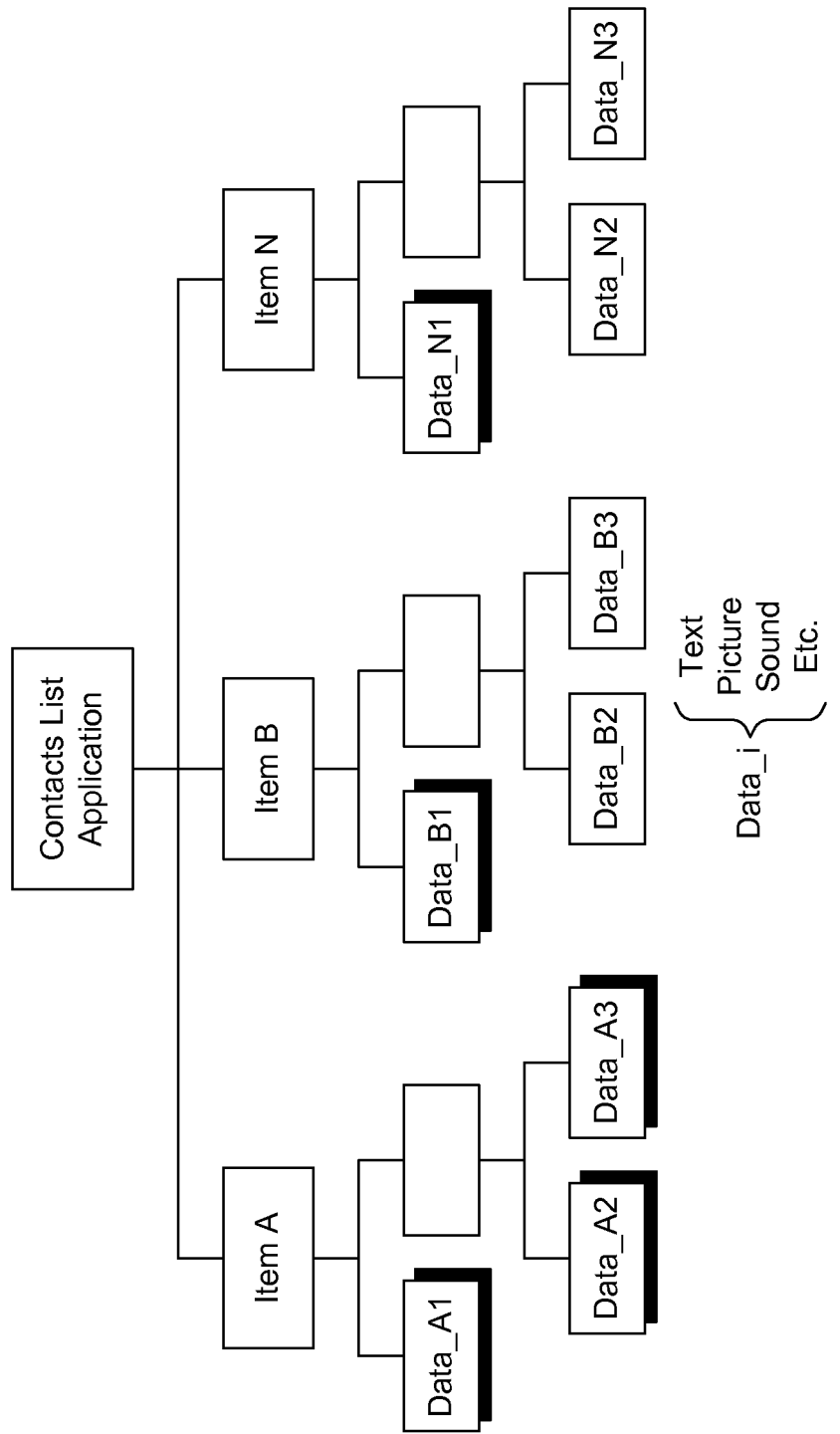
FIG. 5 illustrates a general UI tree structure representative of the GUI shown in FIG. 4.

FIG. 5 shows a general UI tree structure, or component tree, representative of the GUI shown in FIG. 4. In FIG. 5, item A, item B, . . . , and item N each have associated UI data items data_x1, data_x2, and data_x3, with x being equal to A, B, or N. In the example of FIG. 5, data_x1 corresponds to a first text array (name), data_x2 corresponds to a second text array (telephone number), and data_x3 corresponds to a picture of the contact. However, the data items can be associated with any suitable type of data (text, picture, sound, etc). The shadowed boxes represent data items displayed on the GUI of FIG. 4.

According to known methods, the GUI of FIG. 4 is rendered according to the tree structure of FIG. 5 as follows. The Contacts List application is initialized by the operator of the electronic device and the Contacts List application determines to which items it is associated. Subsequently, the Contacts List application determines the visibility state of the items; i.e., the application determines if the items are to be visible, partially visible, or non-visible. In the example of FIG. 5, the items data_A1 (name), data_A2 (telephone number), data_A3 (picture), data_B1 (name), and data_N1 (name) are determined to be visible. After having made that determination, the Contacts List application retrieves application data and graphical display data only for items that are in the visible state.

A disadvantage of the approach outlined above is that the rendering of the GUI can be slowed down or appear jerky because the application itself (e.g., the Contacts List application) has to control both the application data and the graphical display and cannot update the rendered GUI until it has collected all the data.

Conventionally, as described above, UIs are developed for individual applications by the application developers with limited or no consistency between the UIs for different applications. In addition, UI development may be a cumbersome, time- and labor-intensive process. Once a significant amount of resource has been expended in developing application-specific UIs, there is little motivation or room for tailoring the UIs merely to enhance user experiences. Consequently, user experience is compromised.

For example, in conventional systems, an application is responsible for driving its UI. The application creates the UI elements, composites them into a complete UI screen and is responsible for displaying them. The actual rendering is often handled by the UI framework (e.g., calling the draw function for all widgets on the screen), but most of the code related to the UI is within the application. It is the responsibility of the application to collect the requisite data for each UI and to populate the UI. The data flow in the system is therefore driven by the applications, leading to a large amount of UI-related code in the application that is both difficult to maintain and customize.

Figure 6:
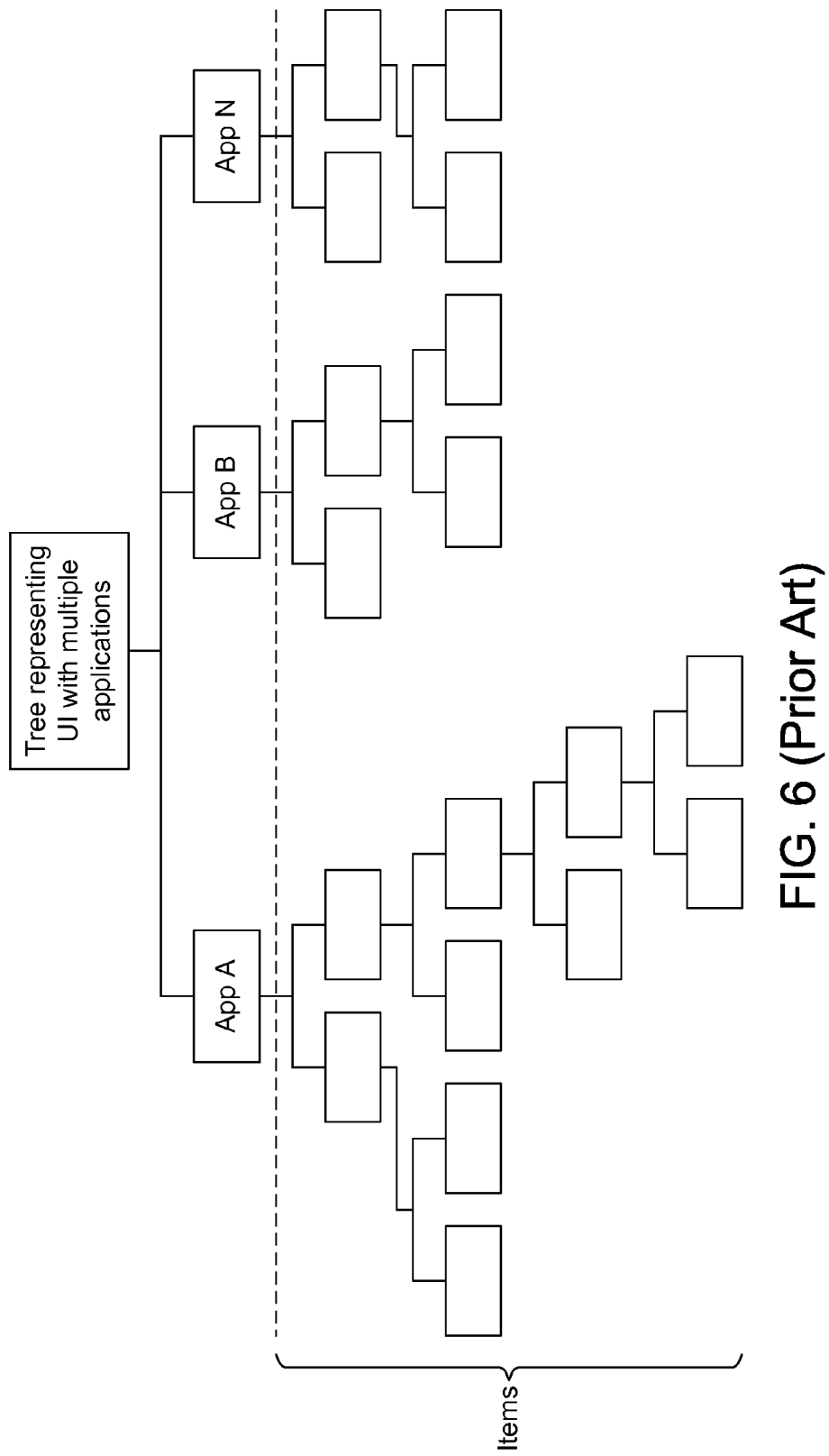
FIG. 6 is an illustration of a tree structure representing a UI with multiple applications.

FIG. 6 shows a tree representation of a UI to which multiple applications are associated. The UI represented at FIG. 6 can have, for each of the multiple applications, a UI element or item, or several elements or items, that can be rendered on the display 112 of the electronic device 100.

As in the example of FIG. 5, the tree representation of FIG. 6 is used to composes a scene to be rendered on the display by populating empty elements in the tree. As will be appreciated, conventional UI frameworks, where each application is responsible for its own UI, make it difficult to achieve a good UI, from the point of view consistency or visual appeal, when multiple applications interact with each other.

Figure 7:
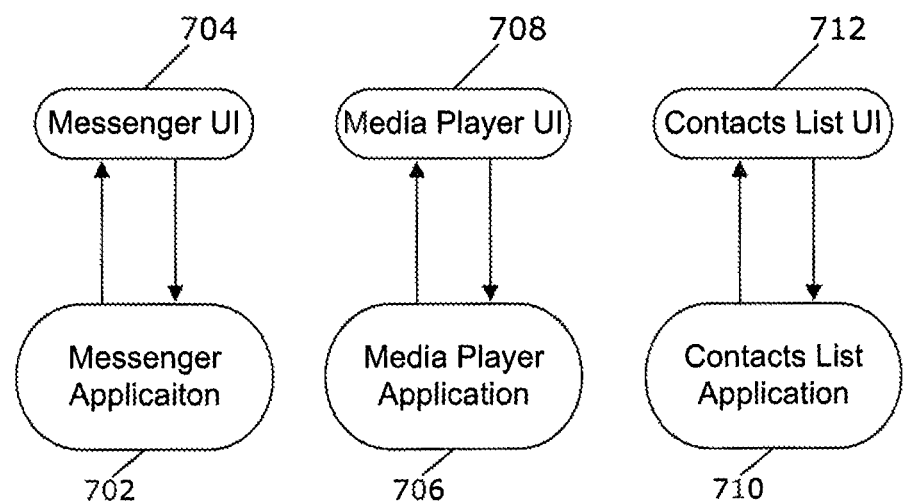
FIG. 7 is an illustration of application driven UI architecture with each application having an associated UI.

For example, when a user wishes to "send a media item in MMS to a specific contact," the process involves UIs from three applications (e.g, Media Player, Messenger and Contact List applications) installed on the electronic device 100 as shown in FIG. 7. The applications may be stored on memory 110 of the electronic device 100. Each application has its associated UI. For example, the Messenger application 702 has an associated Messenger UI 704; the Media Player Application 706 has an associated Media Player UI 708; and the Contacts List Application 710 has an associated Contacts List UI 712. A visually seamless UI is difficult to implement under this scenario.

The method and system described herein provide a UI framework that is independent of device platform (e.g., independent of mobile device architecture and operating system) as well as application framework (e.g., independent of application programming language). The UI framework described herein provides scalability, improved graphical capabilities and ease of customization, and results in enhanced user experiences.

Figure 8:
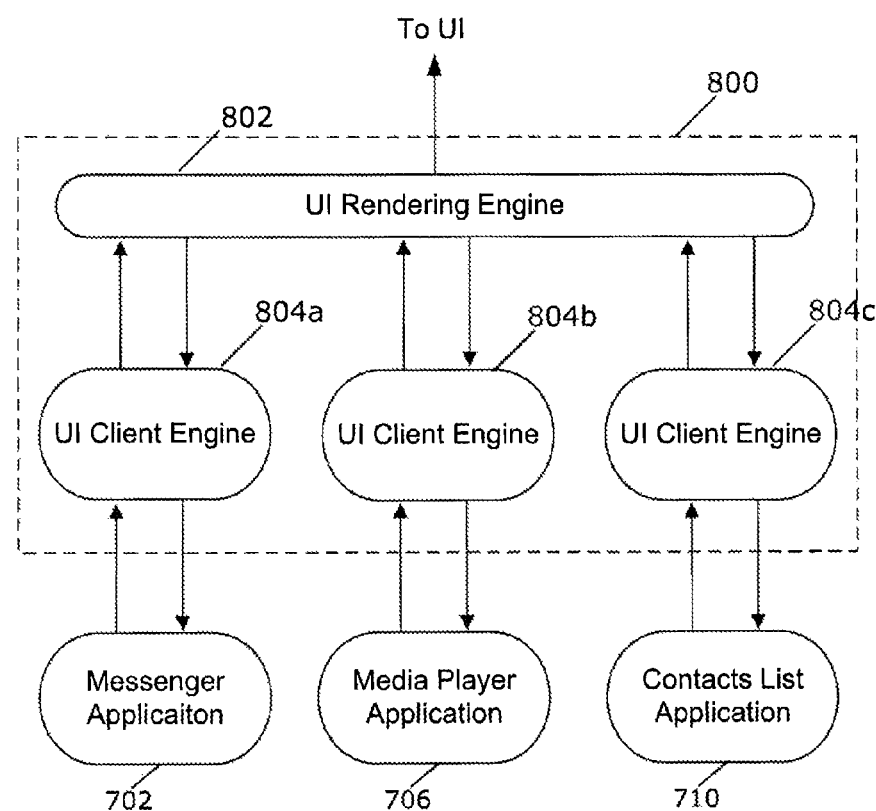
FIG. 8 is illustration of UI driven UI architecture with multiple applications having a seamless UI.

The UI framework is used by applications to render their UIs. The UI framework is itself not an application framework (i.e., is not used for developing applications) and does not impose any rules on application structuring or application management. The UI framework does not provide application functionality. The applications themselves implement the functionality (or business logic) behind the UI. However, using the UI framework removes all UI call functionalities from the application code and instead lets the UI control data call functions. Thus, a the UI can interact with multiple applications for data requests in a seamless manner. FIG. 8 illustrates the earlier example of FIG. 7 that uses three different applications, viz., the Messenger Application 702, Medial Player Application 706, and Contacts List Application 710, but a single UI framework 800, having a UI rendering engine 802 and UI client engines 804a, 804b, and 804c associated with each application 702, 706 and 710, to provide the UI tools for "sending a media item in MMS to a specific contact."

The single UI framework 800 described herein enforces a clear separation between UI visualization, UI logic, and UI data thereby allowing the creation of a seamless and truly rich UI. The applications are reduced to simple services, responsible for performing business logic and provide the data that the UI requests. An advantage of the single UI framework is that it allows that UI designer to create any user scenario without having to account for the applications that are currently running on the device. That is, the UI is driving the data flow. If there is a list on the screen displaying the contacts, there will be requests for data to the Contacts List application. The UI designer can readily use any application available on the device for its UI without having to specifically create or implement UI elements and populate the lists. Consequently, this architecture enables seamless cross application scenarios such as the example shown in FIG. 8.

Figure 9:
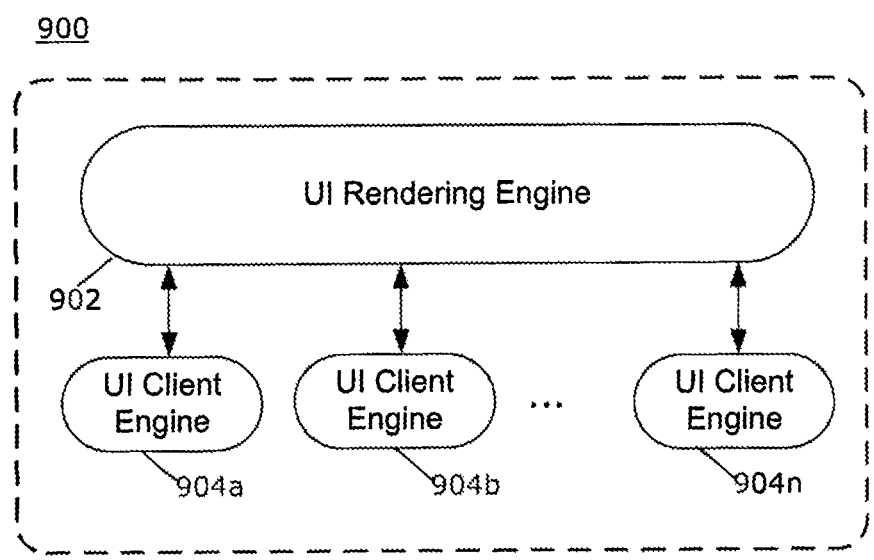
FIG. 9 is a schematic representation of the modules of the UI driven UI architecture of FIG. 8.
Figure 10:
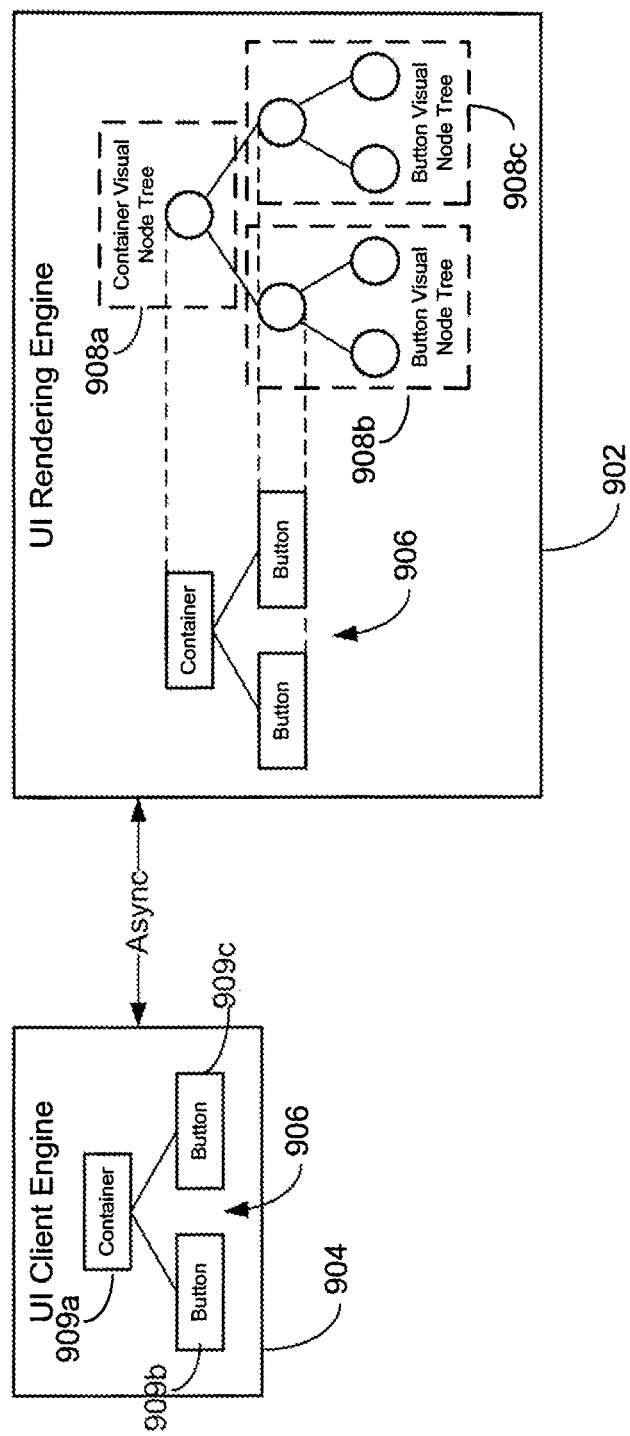
FIG. 10 is a block diagram of a UI client engine and a UI rendering engine.

As noted above, the UI framework 800 described herein comprise multiple modules or engines: typically, a single UI rendering engine 902 for a device or a display; and separate UI client engines 904a, 904b, . . . 904n associated with separate applications, as shown in FIG. 9. Each of these modules is described in further detail below with reference to FIG. 10.

Each UI client engine 904 is responsible for providing UI data from its associated application to the UI rendering engine 902. The UI client engine 904 is responsible for setting up UI component trees and informing the UI rendering engine 902 of the tree structure 906. The UI client engine 904 gets this information from the application. For example, the application code could specify the creation of elements, such as buttons and containers, programmatically in a language such as C++, or the application could describe the tree in a declarative language, such as XML, and have the UI client engine load it.

The UI rendering engine 902 mirrors the tree 906 set up by UI client engine 904. UI rendering engine 902 sets up visual node trees 908a, 908b, 908c for each UI element 909a, 909b, 909c of the UI component tree 906. To set up the visual node trees, the UI rendering engine 902 has predefined visual node trees for each UI component that the UI client engine 904 provides. For example if the UI client engine 904 sets up a Button, the UI rendering engine 902 will have a predefined visual node tree for Button which it will use. Typically, this predefined visual node tree will be described in a markup language, such as XML, but it could also be described in programmatic code, such as an API. The visual node trees are used for rendering the elements (for example the background, foreground and highlight images of a button is represented in the visual node tree 908b). The UI client engine 904 is not aware of the visual node trees.

The UI rendering engine 902 handles the logic and event handling associated with the UI elements that composite the UI (e.g., lists, menus, softkeys, etc.). The UI rendering engine 902 receives data from the UI client engine in an asynchronous manner, and binds the data to its visual nodes in the visual tree. As used herein "asynchronous" means that the transmission of data from the UI client engine 904 to the UI rendering engine 902 is independent of processing of data, or inputs, by the application. All data that can be presented in the UI for processing as a single thread is made available to the UI rendering engine 902 as it is available to the UI client engine 904. The underlying application processing and data sources behind the UI client engine are hidden from the UI rendering engine 902. The UI client engine 904 and UI rendering engine 902 can execute separate threads without waiting for responses from each other. In this manner, the UI rendering engine 902 can render the UI tree (using the visual node tree) without being blocked or stalled by UI client engine 904.

Since the UI client engine 904 sends data to the UI rendering engine 902 as it becomes available, the UI client engine 904 must also indicate to the UI rendering engine 902 whether the data is complete, or to await further data prior to rendering. In an example implementation, the data items necessary for rendering the UI form a "transaction." Rather than waiting until all required data items are available, the UI client engine 904 can send data items relating to a single transaction in several communications or messages as they become available, and the messages will be received asynchronously by the UI rendering engine 902. The UI rendering engine 902 does not start processing the received data items until it has received all messages that at are part of the transaction. For example, the UI client engine 904 can inform the UI rendering engine 902 that one container with two child buttons has been created as one transaction. The UI rendering engine 902 does not process this transaction until it has received all data items related to the particular transaction; in other words, the UI rendering engine will not create the container and buttons before it has all the information.

The UI client engine module 904 and the UI rendering engine 902 are as decoupled from each other as possible. The UI client engine 904 is not aware of where in the UI its data is used, i.e., it does not hold a UI state.

The elements are the building blocks of the UI. The elements of the UI component tree represent the basic UI elements, lists, menus, tab lists, softkeys, etc. Elements are typically specified in a declarative language such as XML or JSON (currently QML which is JSON based), and given different attributes to make them behave as desired.

Examples of attributes include, but are not limited to, rendered attributes, response attributes, and decoding attributes. Rendered attributes refers to any attribute that specifies how a UI element is rendered. Examples of rendered attributes can include, but are not limited to color, opacity/transparency, the position on the display, orientation, shape, and size. In various embodiments, the position on the display can be described with any suitable coordinate system including (x,y) coordinates or (x,y,z) coordinates. The term color can include, but is not limited to, a luminance, hue, or saturation.

Examples of response attributes can include any attribute that specifies how the user interface element responds to commands or inputs, such as for example, but not limited to a single tap, double tap or swipe. For example, a response attribute can specify a speed of a double tap for the UI element.

Decoding attributes can include, but are not limited to, image decoding priority.

A complete UI is a set of elements composited in a visual tree. The elements interpret their associated data—for example, a menu component will interpret the data differently from a list component. The elements react upon events—for example, when a key is pressed or other event is posted to the UI, the elements in the UI will react, e.g., move up and down in a list or opening a sub menu. The elements also bind data to their respective visual tree nodes. The elements have built in UI logic (such as "highlight when pressed", "scroll when flicked", "navigate to tab 3 when tab 3 icon is clicked"), but the application logic (such as "start new application", "find shortest route to bus station", etc.) is in the application code, and typically is triggered by high level events from the elements (e.g. a "Button Click" event detected by the UI rendering engine 902, and passed to the UI client engine 904, may trigger the application to "find shortest route").

Visuals define the appearance of elements, and are specified in the visual node trees. In an example, the visuals may be defined in XML. The XML could be generated independently or using a suitable visuals generation application. A visual could, for example, be a generic list that can be used by several different lists or a highly specialized visualization of a media player with a number of graphical effects and animations. Using different visual representations of elements is an effective way to change the look and feel of the UI. For example, skin changes can readily be done simply by changing the visuals of components in the UI.

If the visuals have a reference to a specific data element, the UI client engine 904 retrieves the data from the application and transmits it to the UI rendering engine 902. The UI client engine 904 also initiates animations on visuals. For example, UI client engine 904 can create and start animations on properties of UI elements (position, opacity, etc.). The UI client engine 904 is unaware of the actual composition and structure of its visuals. For example, when a list item receives focus, the list element will assume that there is animation for focusing in the list item visuals. The UI rendering engine 902 executes started animations. Animations run without involvement from the UI client engine 904. In other words, the UI client engine 904 cannot block the rendering of animations.

The UI rendering engine 902 is a rendering engine that may be specifically optimized for the electronic device 100. The rendering engine 902 is capable of rendering a tree of visual elements and effects and performing real time animations. The UI rendering engine 902 renders the pixels that eventually will be copied on to the physical display 112 of the electronic device 100. All elements active on the display have a graphical representation in the visual tree.

UI rendering engine 902 processes touch/key input without UI client engine involvement to ensure responsiveness (for example, list scrolling, changing of slider values, component animations, etc. run without UI client engine involvement).

UI rendering engine 902 notifies UI client engine 904 that a button has been pressed, slider has been dragged, etc. The UI client engine 904 can then react on the event (for example change the brightness if the slider has been dragged), but as already mentioned the UI client engine 904 does not need to be involved in updating the actual UI, only in responding to events from the UI.

Figure 11:
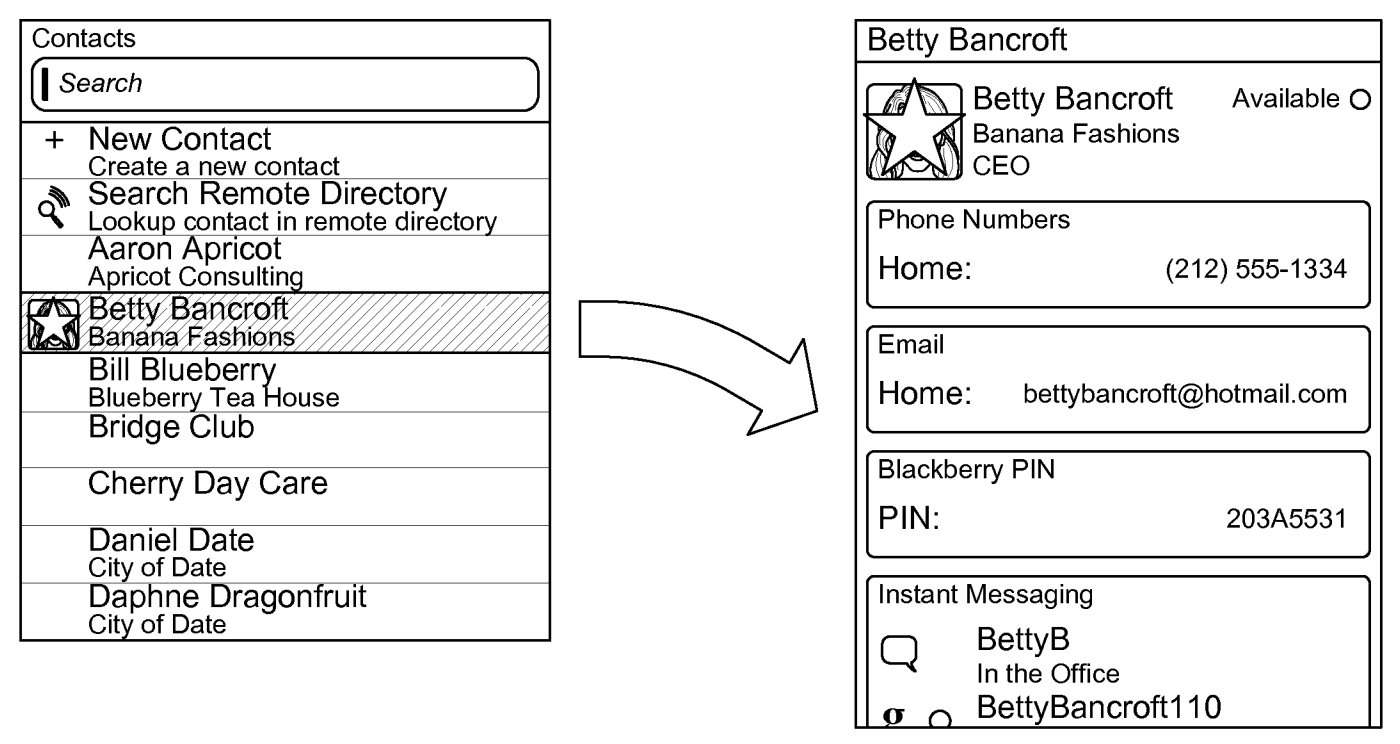

The advantages of the UI driven architecture described herein is readily apparent during runtime. Runtime behavior is defined by what is visible on the display screen of the device. For example, a "Main View" of the Contacts List application is shown in FIG. 11. For a transition from the "Main View" to a "Detailed Contact Information" view, the UI client engine 904 will signal a transition to the UI rendering engine 902. The UI rendering engine 902 will instantiate the visual node tree of the "Detailed Contact Information" elements. The graphics needed by the visuals can be read, for example, from an associated file system, for example, local memory 110 of the electronic device 100. The UI client engine 904 also provides the UI rendering engine 902 with the data for the currently focused contact (i.e., the contact currently selected or highlighted on the display screen among the list of contacts that are currently displayed). The UI client engine 904 can retrieve the necessary data by, for example, calling a data providing API of a contacts list data service, which then provides data items, such as home number, mobile phone number, email, thumbnails, etc. for the contact.

The UI rendering engine 902 populates the visual node tree of the "Detailed Contact Information" elements, and a visual transition between the two screens is started. The UI rendering engine 902 runs and renders an animation associated with the transition. When the transition is complete, the visual node tree of the "Main View" is unloaded and all data bindings associated with the visuals can be released. Thus, the application (e.g., the Contacts List application 710) does not need to drive the UI, it basically only needs to supply the data that the client engine 904 requires to enable the UI rendering engine 902 to render the UI.

One Server/Single Client

Figure 12:
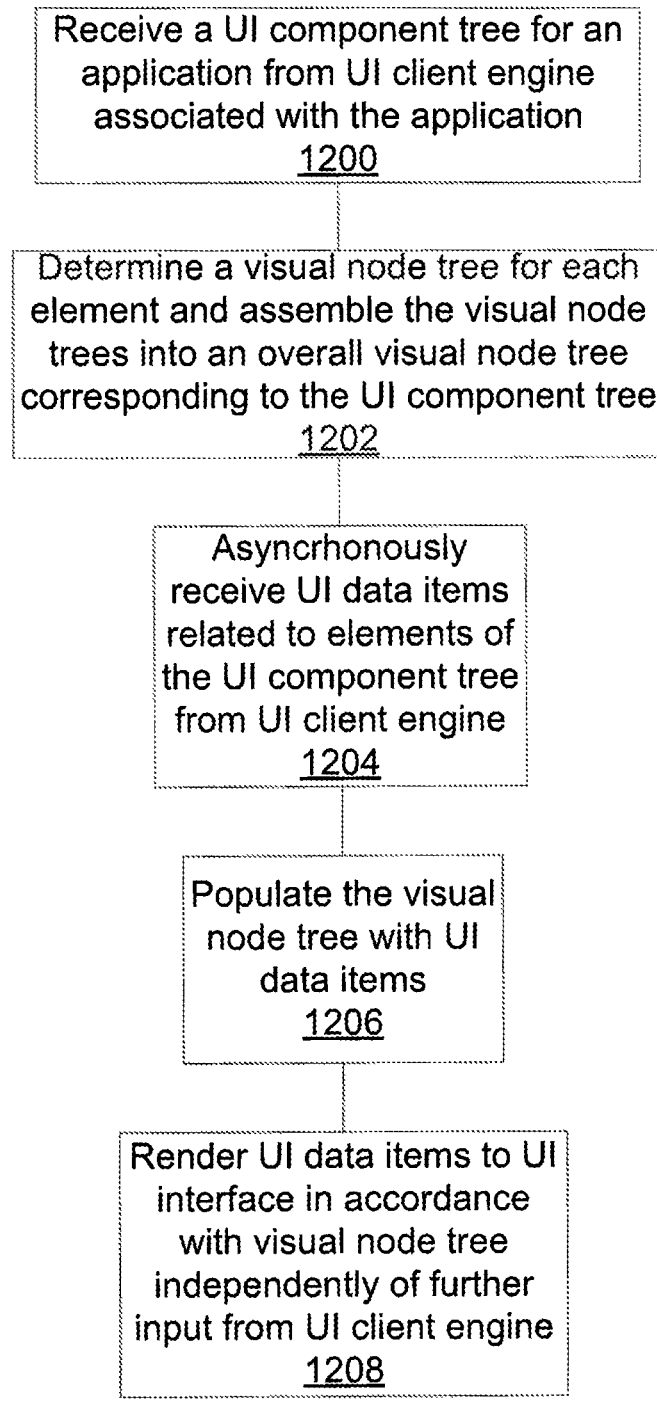
FIG. 12 is a flowchart depicting a method of rendering a user interface for a single server or single client.
Figure 13:
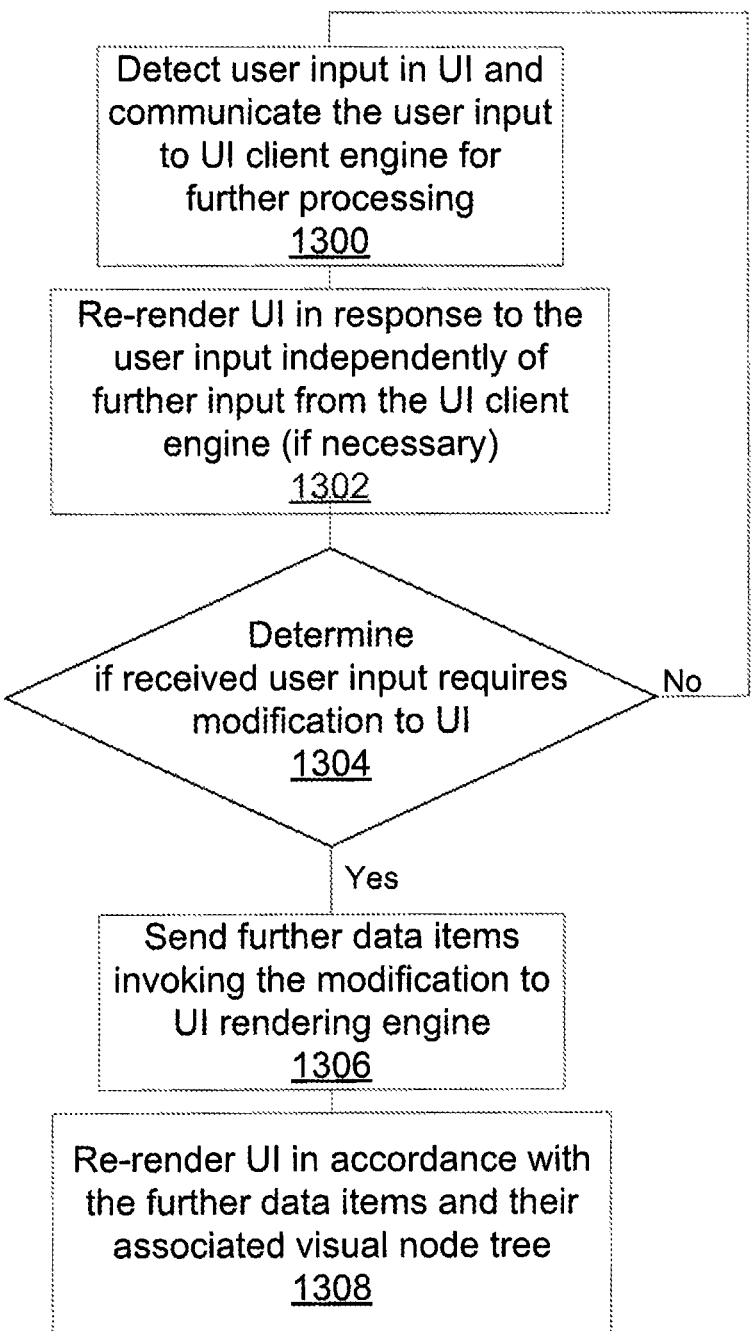
FIG. 13 is a flowchart depicting a method of rendering a user interface for a single server or single client including the step of re-rendering the UI.

Thus, according to one aspect, there is provided a method of rendering a user interface (UI), as shown in FIG. 12. From the point of view of the UI rendering engine 902, the method comprises receiving a UI component tree for an application from a UI client engine associated with the application (step 1200). Based on the component tree, the UI rendering engine 902 then determines a visual node tree for each element, and assembles the visual node trees into an overall visual node tree corresponding to the UI component tree (step 1202). The UI rendering engine then asynchronously receives, from the UI client engine 904, UI data items related to elements of the UI component tree (step 1204). The UI rendering engine 902 populates the visual node tree with the UI data items (step 1206), and renders them to the UI in accordance with the visual node tree, independently of further input from the client UI engine (step 1208). Since the UI client thread, which depends on interaction with the application, is separate and independent from the UI rendering thread, the render thread cannot be blocked by the application processing In further aspects of this method, and as shown in FIG. 13, when the UI rendering engine 902 detects a user input in the UI, it communicates the user input to the UI client engine 904 for further processing (step 1300). In addition, if necessary, the UI rendering engine 902 re-renders the UI in response to the user input independently of further input from the UI client engine 904 (step 1302). For example, if the user input is a button press, the UI rendering engine 902 re-renders to animate a button associated with the button press; if the user input is a slider drag, the UI rendering engine 902 re-renders to animate the UI to animate a dragging of a slider; and if the user input is a list scroll, the UI rendering engine 902 re-renders to animate the UI to scroll a list.

If the UI client engine 904 determines that the user input received from the UI rendering engine 902 requires new data (step 1304), termed herein a "modification" to the UI, the UI client engine 904 sends further data items (step 1306) invoking the modification to the UI rendering engine 902, which then re-renders UI in accordance with the further data items and their associated visual node tree (step 1308), independently of further input from the client UI engine 904. For example, as described above, the UI client engine could initiate an animation effect.

One Server/Multiple Clients

Figure 14:
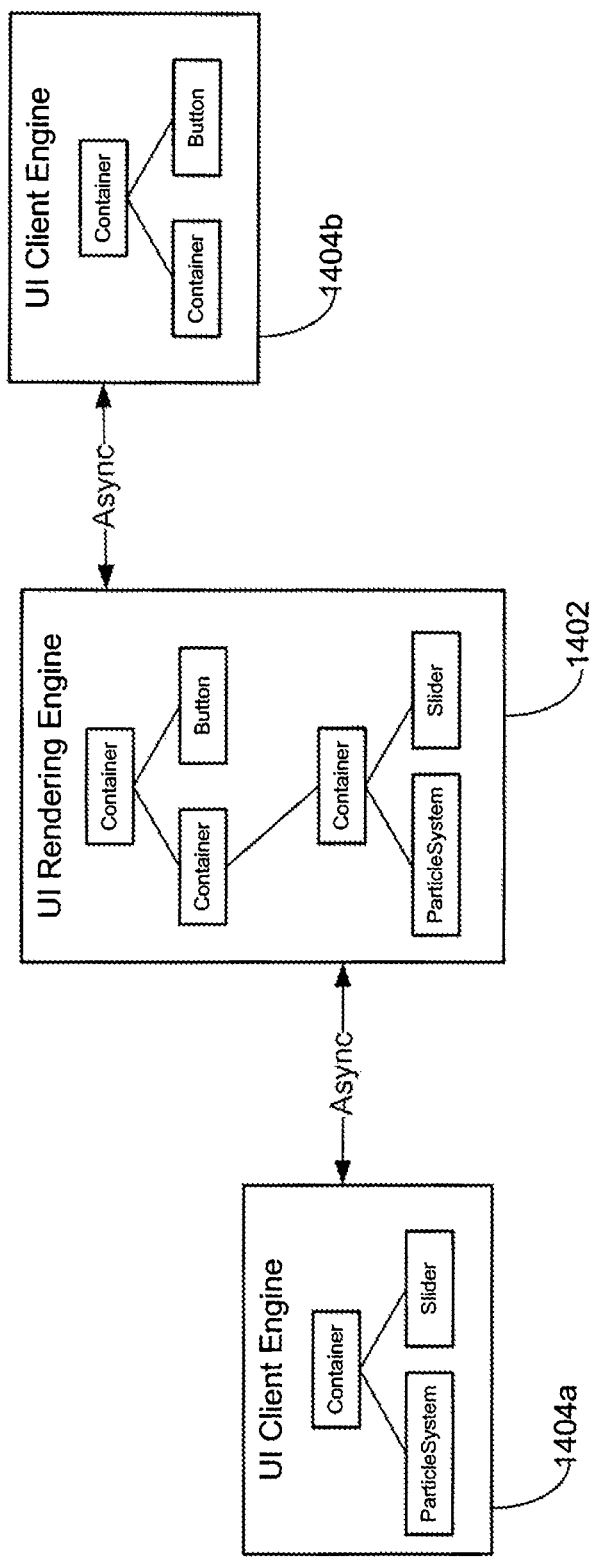
FIG. 14 is a block diagram of a system for rendering a user interface where a single UI rendering engine supports multiple client engines.

According to another aspect, and as shown in FIG. 14, the method can be implemented such that a single UI rendering engine 1402 can support multiple UI client engines 1404a, 1404b. Thus, multiple applications can coexist on the single UI rendering engine 1402. The UI client engines 1404a, 1404b are each associated with an application, or an instance of an application, while the UI rendering engine 1402 is associated with a display.

Each UI client engine determines a corresponding UI component tree for its respective application. Each UI client engine also receives inputs from its respective application related to elements of its UI component tree, and determines UI data items related to the inputs.

Figure 15:
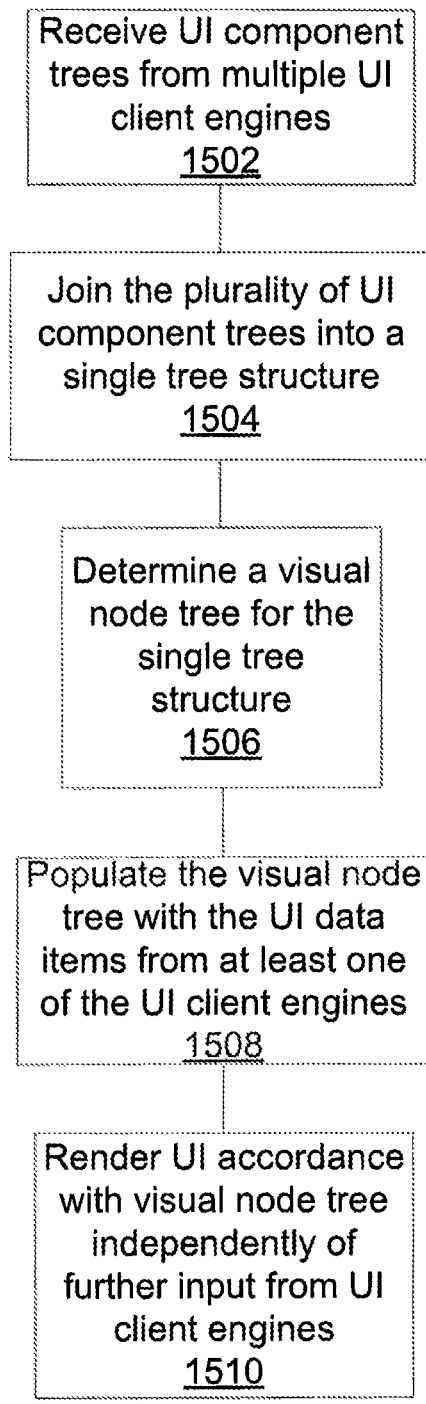
FIG. 15 is a flowchart showing a method of rendering a user interface where a single UI rendering engine supports multiple UI client engines.

As shown in FIG. 15, the UI rendering engine 1402 receives the UI component trees from the UI client engines 1404a, 1404b (step 1502). The UI rendering engine 1402 then joins the plurality of UI component trees into a single tree structure (step 1504). To specify the parameters for joining the trees, the UI client engines 1404a, 1404b can, for example, define or indicate where in their trees other trees can be inserted. Subject to the logic implemented in the UI rendering engine 1402, the UI client engines 1404a, 1404b can indicate the location of possible tree insertions in a generic way, such as "here it is ok to insert a background effect". The UI client engines 1404a, 1404b can also suggest, define or indicate where their tree should be inserted. This indication can also be performed in a quite general way, such as "I want to insert a particle effect in the background". The UI rendering engine 1402 can then determine an appropriate location to insert the tree within the UI tree structure.

Once in possession of a the single tree structure, the UI rendering engine 1402 determines a visual node tree for the single tree structure (step 1506), and then populating the visual node tree with UI data items received from at least one of the plurality of UI client engines (step 1508), and renders the UI in accordance with the visual node tree independently of further input from UI client engines (step 1510), as described above.

Different UI client engines 1404a, 1404b with different language bindings can coexist in same node/render tree, no matter what runtime limitations the language has (e.g. Python & threads). Since the individual UI component trees of the applications are combined to a single joint UI tree on the UI rendering engine 1402, the UI that is rendered by the server will, for end-users, appear as if all the applications UIs are part of the same application.

Using widgets as an example, the widgets could be separate processes/applications (as opposed to threads). The UI client engines associated with each widget can inject their UI into a single tree. Since the UI component tree is scene graph-based the UIs can be part of the same layout system, making it possible for the UIs to interact and to apply common effects to the overall UI. For example, a cool particle system effect could be applied to the UI component tree, thereby interacting with the UIs for each widget.

In a further example, one application could have a list while the list items provided by the UI client engine could consist of data items provided by the UI client engines of other applications.

According to another aspect, the method can be implemented such that the single UI rendering engine 1402 can support multiple UI client engines 1404a, 1404b, and their associated applications, running on different devices or platforms, such as a local device and an application running on a remote device, such as in the cloud or on networked server. One example is internet TV, where several UI client engines share UI input and output with a common UI rendering engine. Another example is in the automotive context. Multiple applications, such as navigation, infotainment, etc., can use a common UI rendering engine to render their own UI elements to a display in the vehicle. As above, since the UI client engines for each application inject their trees and data items into the same tree on the UI rendering engine, all scene graph UI advantages apply. The UI rendering engine does not need to know anything about a new application, so, for example, the UI client engine for a new car radio application can be transparently injected into the common UI.

Single Client/Multiple Servers

Figure 16:
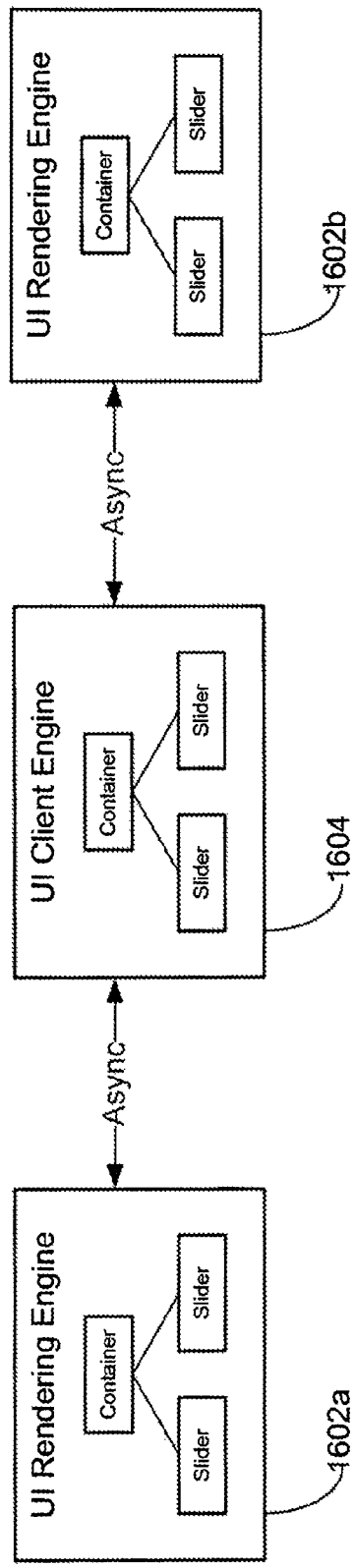
FIG. 16 is a block diagram of a system for rendering a user interface where multiple UI rendering engines support a single UI client engine.

According to another aspect, and as shown in FIG. 16, the method can be implemented such that a multiple UI rendering engines 1602a, 1602b can support a single UI client engine 1604, and its associated application. For example, the single UI client engine 1604 can inject its tree, and provide data items to multiple devices, such as a desktop computer and a portable electronic device. Each device can have a separate UI rendering engines 1602a, 1602b, optimized for its particular form factor and display capabilities. Since the UI rendering engines 1602a, 1602b do their own rendering, it is possible to make a distributed UI that is responsive regardless of transport layer performance.

According to this aspect, the UI client engine 1604 determines a UI component tree for the application, receives inputs from the application related to elements of the UI component tree, and determines UI data items related to the inputs, as described above. The UI client engine then interfaces with two or more UI rendering engines, each of which can be associated with a separate display, or be designed and optimized for different performance, as described below.

Figure 17:
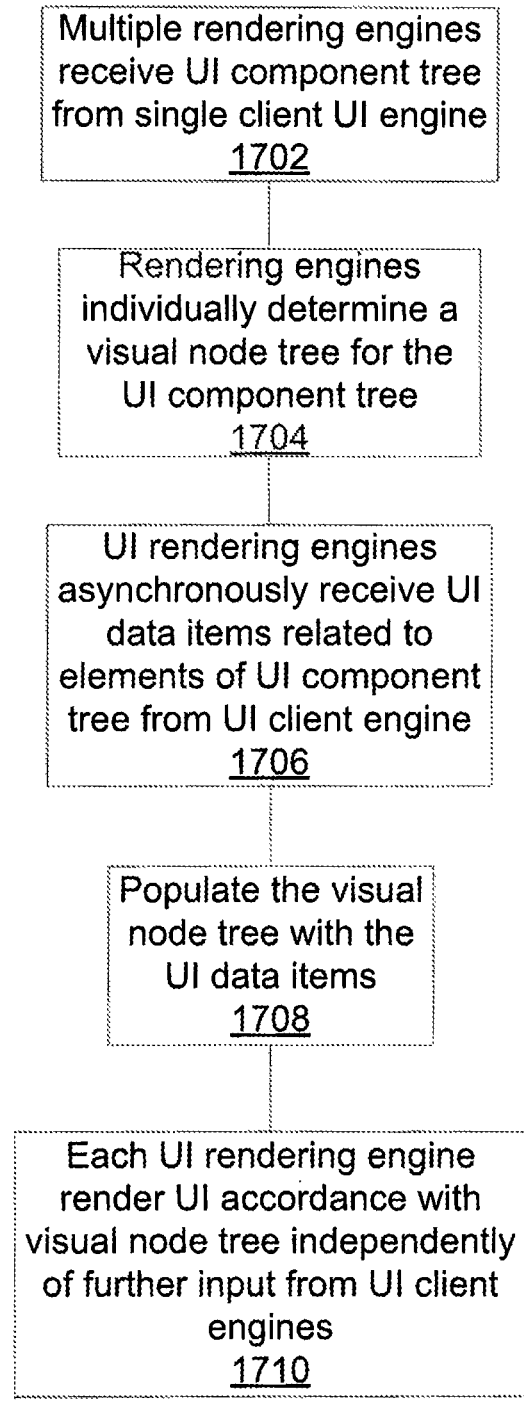
FIG. 17 is a flowchart showing a method of rendering a user interface where multiple UI rendering engines support a single UI client engine.

With reference to FIG. 17, the UI rendering engines 1602a, 1602b each receive the UI component tree from the client UI engine 1604 (step 1702), and individually determine a visual node tree for the UI component tree (step 1704). The separate UI rendering engines 1602a, 1602b asynchronously receive, from the UI client engine 1604, the UI data items related to elements of the UI component tree (step 1706), and populate the visual node tree with the UI data items (step 1708). Each UI rendering engine then renders the UI in accordance with the visual node tree independently of further input from the client UI engine (step 1710).

If a user input, such as a touch event or gesture, is detected by one of the UI rendering engines 1602a, 1602b, the input is communicated back to the UI client engine 1604, and to the other UI rendering engine. Both UI rendering engines can then re-render the UI if appropriate, while the UI client engine can provide the input to the application, or otherwise act upon it.

As a further example, the single UI client engine 1604 can use several UI rendering engines on a same device. For example, UI rendering engine 1602a could include an OpenGL renderer, while UI rendering engine 1602b could include a software rendering backend/rasterizer. The different UI rendering engines could, for example, be different versions of the rendering engine on the same device. For example, UI rendering engines 1602a, 1602b could be designed to render at different frame rates to serve different displays on a multi-display device. The UI rendering engines 1602a, 1602b could provide different power management capabilities. For example, using wallpaper as example, UI rendering engine 1602a could render wallpaper or background with less fidelity (lower resolution) to meet power management requirements.

It is also contemplated that the UI rendering engines 1602a, 1602b could form a dynamic cluster, distributing different UI elements of a client application between rendering engines to meet metrics like expected FPS, power management, and resource management. The UI rendering engines 1602a, 1602b can, for example, selectively render different elements or parts of the UI, as defined by the UI client engine 1604. The division of rendering tasks can be, for example, defined in an appropriate markup language, such as XML, or programmatically, such as in an API. Generally, the UI rendering engines 1602a, 1602b work independently to render their element(s) of the UI. However, in a standalone mode, the UI rendering engines 1602a, 1602b could exchange data to improve rendering efficiency.

The UI rendering engine or engines receive information and instructions concerning what elements should be displayed via the UI component tree and/or via other data items transferred from the UI client engine to the UI rendering engine. This transfer of data may be via a direct memory map, via an inter process communication bridge, or across a wired or wireless network in the case that the UI client engine and the UI rendering engine are on separate devices. Different instructions from the UI client engine or engines will require different amounts of time for the UI rendering engine to execute them. A fixed frame rate may be set for a display associated with a UI rendering engine. In order to ensure smooth transitions and to update the display at the required frame rate, the UI rendering engine should preferably render the UI at a rate at least as fast as the frame refresh rate of the display. Otherwise stated, the time from receiving an instruction from the client engine to rendering the UI to the appropriate display should preferably not exceed the amount of time between subsequent frames at a given frame rate.

Figure 18:
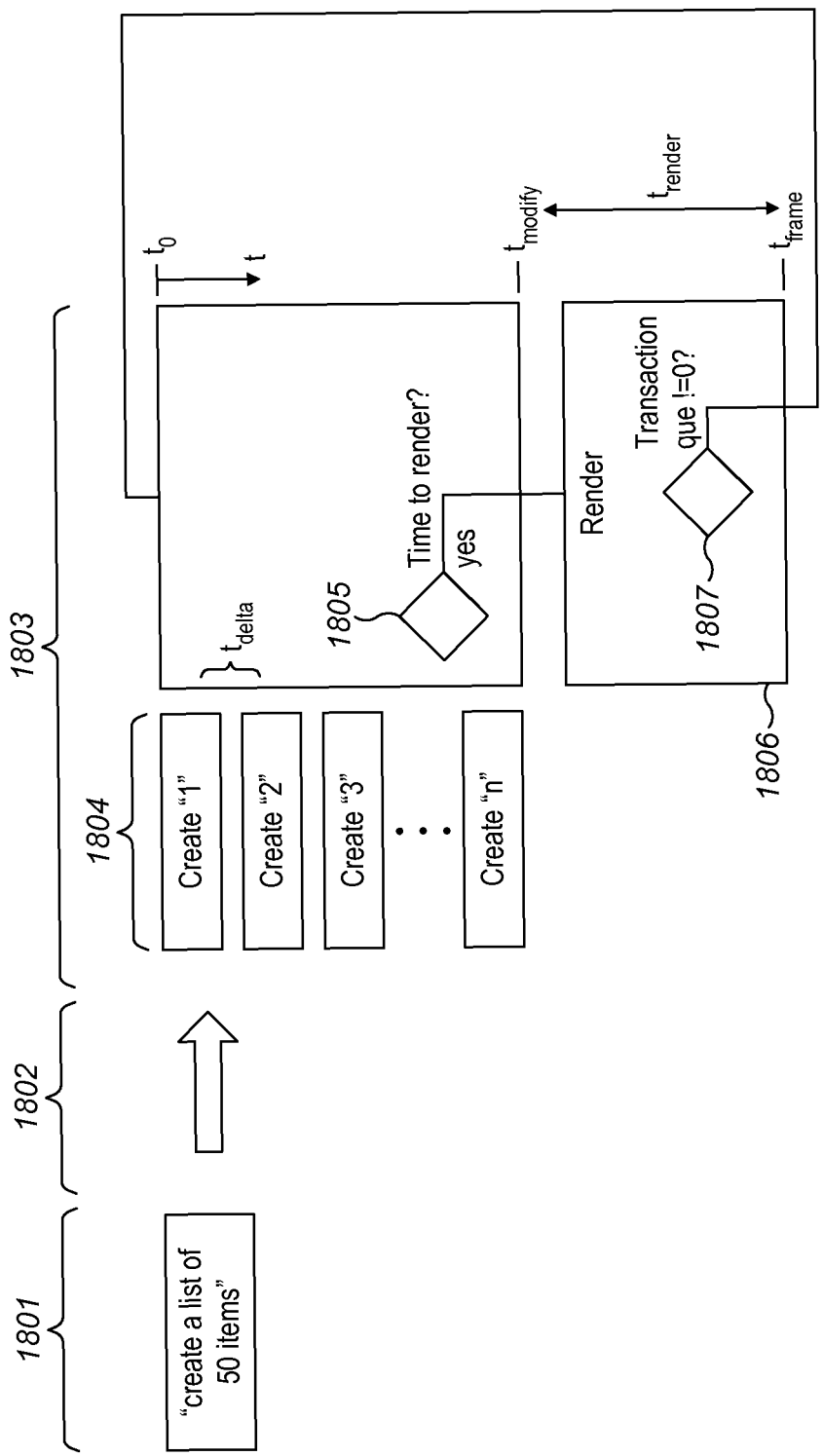
FIG. 18 is a flowchart showing a method of rendering a user interface taking into account a frame refresh rate of the UI.

A UI rendering engine may therefore be configured to monitor a time remaining to render the UI and to determine whether sufficient time remains to carry out a further UI modification step before rendering the UI to the display, or whether it is necessary to render the UI without performing further modification steps. A simple example is shown in FIG. 18. In the example shown, a UI client engine 1801 has issued an instruction to a UI rendering engine to create a list of fifty items. The UI rendering engine is capable of determining whether the creation of the full list would take longer than the time available before the next rendering of the UI should be carried out. This time is set by the frame refresh rate of the UI and the time required to carry out the final rendering step after the list items have been created. The list can be broken down into individual steps to create individual list items or sub-sets of list items within the time available between subsequent UI frames. A queue of individual list items to be modified or created can therefore be compiled to queue the items for creation or modification in a queue 1804. A UI rendering engine 1803 creates each item in the list in a UI modification step, requiring a length of time $t_{delta}$. Different cases may exist, where $t_{delta}$ is smaller than, substantially similar to, or greater than $t_{frame}$. Where $t_{delta}$ is significantly smaller than $t_{frame}$, it may be possible for the UI rendering engine to carry out a number of sequential UI modification steps before carrying out the step of rendering the UI to the display with which it is associated. The modification steps are queued in queue 1804 and processed by the UI rendering engine, under the control of the UI rendering engine. In this case, the UI engine must monitor a time t to determine whether there remains sufficient time to carry out a further UI modification step before rendering the UI, or alternatively whether it is now necessary to render the UI to the display, in order to avoid any discontinuities in the updating of the display, which can result in screen judder or other such undesirable artefacts during UI transitions. The UI rendering engine therefore carries out a comparison step 1805 in which it determines whether sufficient time t remains to carry out a modification step relating to the following item in the queue 1804, or whether it should render the modifications processed so far before creating the next item in queue 1804.

The queue 1804 may comprise any of a selection of different UI modification steps. In addition to, or alternatively to, creating list items, these steps could include the scaling of an image, performing animation steps, changing attributes of the appearance of existing UI items or any other such change, addition or deletion from the UI. Therefore, by monitoring a time remaining to render the UI and deciding whether to process a next item from the queue 1804, the UI engine can effectively meet the frame fresh rate requirements of a display associated with it, whilst processing UI modification steps from a queue 1804. The time required to render the UI may include, for example, the time required to transfer the UI matrix from a UI engine memory to a memory to be read by the display and/or to alert the display that the UI is rendered and ready for display to read and/or to update markers in a memory to flag to the display that the UI is ready for display in order to instigate the updating of the display from the memory. This is the rendering time indicated by $t_{render}$ at box 1806.

This process can be created any number of times and can essentially be constantly updated in a recurring loop, optionally for as long as items are present in the queue 1804. This check may be made at step 1807 to determine whether the loop should recur after each rendering step.

There may be occasions where a single modification step placed in queue 1804 requires a time greater than $t_{frame}$ for the UI rendering engine to complete. This can be the case in the example of processor-heavy operations, such as image- or video-scaling, or manipulation of complex animations or visual effects. Another example may be the list of fifty items illustrated in FIG. 18. In this case, it can be beneficial for the UI rendering engine to be able to determine whether it will be able to complete a modification and render a new frame to the display in the time available. If not, it may be necessary to render an alternative item, such as a rendering of partial results, or of a place holder item until the modification step has completed. A place holder item may be a simple re-rendering of a previous frame, a plain (e.g. black, white or any other color) frame, or a transparent frame only showing a background layer, for example. A partial result may be the rendering of a partially created list, with or without a partially modified set of data for display in the list items already modified or created.

The UI rendering engine may hold data relating to the time required for certain modification steps in a memory, e.g. in a look up table which may be populated based upon statistics derived from monitored use of the device. Based upon these records, the UI rendering engine may be configured to prepare or render a partial result based upon prior knowledge of the time required for a modification step for an item in queue 1804. The UI rendering engine may further be configured to record instances where a UI modification step has taken more time than $t_{frame}$, so that if such a previously un-encountered modification step is requested once more, the UI rendering engine can be prepared to render a partial result, rather than waiting for a complete result before rendering the UI to the display. In this way, the frame rate of the UI can be more consistently met and the user experience thus improved.

Implementations of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an implementation of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope. In some instances, features of the method and/or the device have been described with respect to different embodiments. It is understood that all the features described herein may be included in a single embodiment, where feasible.

What is claimed is:

1. A user interface (UI) system comprising:
one or more electronic devices each having one or more processors and a memory, the memory or memories carrying instructions which, when carried out by the processor or processors of the one or more electronic devices, cause the processor or processors of the one or more electronic devices to be configured to provide:
a UI client engine associated with an application, the UI client engine configured for:
determining a UI component tree for the application,
receiving inputs from the application related to elements of the UI component tree, and
determining UI data items related to the inputs; and
a plurality of UI rendering engines each associated with a respective display for displaying a respective UI, each of the plurality of UI rendering engines configured for:
receiving the UI component tree from the UI client engine,
determining a visual node tree for the UI component tree, and
asynchronously receiving, from the UI client engine, the UI data items related to elements of the UI component tree,
populating the visual node tree with the UI data items; and
rendering its respective UI in accordance with the visual node tree independently of further input from the UI client engine.

2. The system of claim 1, wherein the plurality of UI rendering engines are associated with a single device.

3. The system of claim 2, wherein the plurality of UI rendering engines are associated with separate respective displays of the single device.

4. The system of claim 1, wherein the plurality of UI rendering engines are associated with separate respective devices.

5. The system of claim 1, wherein the plurality of UI rendering engines are each further configured for:
detecting a user input; and
communicating the user input to the UI client engine.

6. The system of claim 5, wherein the plurality of UI rendering engines are each further configured for re-rendering the respective UI in response to the user input independently of further input from the UI client engine.

7. The system of claim 6, wherein the user input is a button press, and the re-rendering the UI comprises re-rendering the respective UI to animate a button associated with the button press.

8. The system of claim 6, wherein the user input is a slider drag, and the re-rendering the UI comprises re-rendering the respective UI to animate a dragging of a slider associated with the slider drag.

9. The system of claim 6, wherein the user input is a list scroll, and re-rendering the respective UI comprises re-rendering the UI to scroll a list associated with the list scroll.

10. The system of claim 5, wherein each of the plurality of rendering engines is further configured for:
receiving from the UI client engine further data items invoking a modification, and
re-rendering its respective UI in accordance with the further data items and an associated visual node tree independently of further input from the UI client engine.

11. The system of claim 10, wherein the modification is an animation effect.

12. A method of rendering a user interface (UI), the method comprising:
at each of a plurality of UI rendering engines associated with a respective display for displaying a respective UI:
receiving a UI component tree for an application from a UI client engine associated with the application,
determining a visual node tree for the UI component tree, asynchronously receiving, from the UI client engine, UI data items related to elements of the UI component tree,
populating the visual node tree with the UI data items; and
rendering the respective UI in accordance with the visual node tree independently of further input from the UI client engine.

13. The method of claim 12, where the plurality of UI rendering engines are associated with separate respective displays.

14. The method of claim 12, further comprising:
detecting a user input; and
communicating the user input to the UI client engine.

15. The method of claim 14, further comprising re-rendering the respective UI in response to the user input independently of further input from the UI client engine.

16. The method of claim 14, wherein the user input is a button press, and the re-rendering the respective UI comprises re-rendering the respective UI to animate a button associated with the button press.

17. The method of claim 14, wherein the user input is a slider drag, and the re-rendering the respective UI comprises re-rendering the respective UI to animate a dragging of a slider associated with the slider drag.

18. The method of claim 14, wherein the user input is a list scroll, and re-rendering the respective UI comprises re-rendering the respective UI to scroll a list associated with the list scroll.

19. The method of claim 14, further comprising:
receiving from the UI client engine further data items invoking a modification, and
re-rendering its respective UI in accordance with the further data items and an associated visual node tree independently of further input from the UI client engine;
wherein the modification is preferably an animation effect.

20. The method of claim 12, further comprising:
carrying out one or more UI modification steps from a queue prior to rendering the respective UI;
when a time remaining to render the UI is determined as sufficient to carry out a next modification step in the queue, carrying out the next modification prior to rendering the UI; and
when the time remaining to render the UI is not sufficient to carry out the next modification step, rendering the UI.

21. The method of claim 20, further comprising, when a time required to carry out one of the one or more UI modification steps and render the UI exceeds the time allowed by a frame-rate of the UI, causing the rendering of a placeholder or rendering partial results prior to completion of that UI modification step.

22. An electronic device, comprising:
one or more processors; and
a memory, the memory carrying instructions which, when carried out by the processor or processors, cause the processor or processors to be configured to provide a plurality of UI rendering engines associated with a respective display for displaying a respective UI, the UI rendering engines configured for:
receiving a UI component tree for an application from a UI client engine associated with the application,
determining a visual node tree for the UI component tree, and
asynchronously receiving, from the UI client engine, UI data items related to elements of the UI component tree,
populating the visual node tree with the UI data items; and
rendering the respective UI in accordance with the visual node tree independently of further input from the UI client engine.

23. The device of claim 22, wherein the plurality of UI rendering engines are associated with separate respective devices, or wherein the plurality of UI rendering engines are associated with a single device, and the plurality of UI rendering engines are preferably associated with separate respective displays of the single device.

24. The device of claim 22, wherein the UI rendering engines are each further configured for:
detecting a user input; and
communicating the user input to the UI client engine.

25. The device of claim 24, wherein the UI rendering engines are each further configured for re-rendering the respective UI in response to the user input independently of further input from the UI client engine.

26. The device of claim 24, wherein the user input is one of: a press of a button, a drag of a slider, or a scroll of a list; and
the re-rendering the respective UI comprises re-rendering the respective UI to animate one of the press of the button, the drag of the slider or the scroll of the list, as the case may be.

27. The device of claim 24, wherein the wherein the UI rendering engines are each further configured for:
receiving from the UI client engine further data items invoking a modification, and
re-rendering its respective UI in accordance with the further data items and an associated visual node tree independently of further input from the UI client engine;
wherein the modification is preferably an animation effect.

28. The device of claim 22, wherein the UI rendering engines are each further configured for:
carrying out one or more UI modification steps from a queue prior to rendering the respective UI;
when a time remaining to render the UI is determined as sufficient to carry out a next modification step in the queue, carrying out the next modification prior to rendering the respective UI; and when the time remaining to render the respective UI is not sufficient to carry out the next modification step, rendering the respective UI.

29. The device of claim 28, wherein the UI rendering engines are each further configured to, when a time required to carry out one of the one or more UI modification steps and render the UI exceeds the time allowed by a frame-rate of the UI, cause the rendering of a placeholder or render partial results prior to completion of that UI modification step.

30. A product stored on a non-transitory medium carrying instructions which, when executed by a processor or processors of an electronic device cause the electronic device to be configured to provide a plurality of UI rendering engines associated with a respective display for displaying a UI, the UI rendering engines configured for carrying out a method comprising:

receiving a UI component tree for an application from a UI client engine associated with the application, determining a visual node tree for the UI component tree, and asynchronously receiving, from the UI client engine, UI data items related to elements of the UI component tree, populating the visual node tree with the UI data items; and rendering the UI in accordance with the visual node tree independently of further input from the UI client engine.

\* \* \* \* \*